3,455,697
ALUMINUM-MODIFIED ALGINATE FIBER
William Thomas Atkinson, Minneapolis, Minn., assignor to Archer Daniels Midland Company, Minneapolis, Minn., a corporation of Delaware
No Drawing. Continuation-in-part of application Ser. No. 542,737, Apr. 15, 1966. This application July 25, 1968, Ser. No. 747,463
Int. Cl. A23j
U.S. Cl. 99—14      4 Claims

ABSTRACT OF THE DISCLOSURE

Synthetic fibrous meat products are prepared by spinning a protein/carbohydrate gel mixture into an aqueous coagulating solution containing an alkali earth metal salt and a water-soluble aluminum salt. The resulting fibers are resistant to ion exchange and solubilization when contacted with alkali metal salt.

---

This application is a continuation-in-part of Ser. No. 542,737 filed Apr. 15, 1966, now abandoned.

The present invention relates to the preparation of a synthetic fibrous meat product from aluminum-modified alkaline earth metal carbohydrate fibers. In another aspect, the present invention relates to the modification of alkaline earth metal carbohydrate fibers by treatment with an aluminum salt to inhibit the deteriorating ion exchange encountered by the fibers when they are heated in a solution of an alkali metal salt.

The food industry has expended a great amount of effort in developing satisfactory meat substitutes from protein. To be satisfactory, the substitutes must be nutritious, must simulate the texture, flavor, and appearance of natural meat products and must retain their texture after cooking, so that the mastication properties of the cooked product resembles cooked meat. The prior art has disclosed the preparation of synthetic meat-like materials from various edible protein sources, both vegetable and animal. The protein sources can be formed into fibers and filaments which are coagulated in a suitable bath and oriented by stretching. The protein fibers can be rendered more insoluble to water by treating them with a salt in tows and mixed with a suitable edible binder so that a product resembling meat is produced.

Products, such as those discussed above, have limitations in that they cannot be baked, broiled, boiled, fried, etc., since they are heat labile and, hence, do not retain their shape and texture when cooked.

Ishler et al. disclosed in U.S. Patent No. 3,093,483, which issued on June 11, 1963, that food products which can withstand the high temperatures encountered in cooking can be produced by: (1) forming a solution of a polymeric carbohydrate gel precursor capable of producing a continuous thermostable gel; (2) dispersing, throughout the solution, a proteinaceous material (either inert or modifiable); (3) forming the combined sol into fibers, preferably by extruding through a spinnerette; (4) treating the fibers so formed to gel the precursor and transform the proteinaceous material, if of a modifiable nature, from its solution state into a substantially solid state; and (5) binding the gelled fibers together by means of an edible binder to form meat-like products. Although the process disclosed in this patent provides an excellent thermostable product, the product has some limitations. Specifically, most people, before they consume the fibers, want to flavor them by use of table salt, i.e., sodium chloride. Usually, the "salt" is added during cooking. The treatment of the fibers to gel the precursor is a treatment with a solution of an alkaline earth metal cation, e.g., calcium. The polymeric carbohydrate, before this treatment, is usually in the form of the alkali metal salt, e.g., sodium. The alkali metal carbohydrate is not tough and resilient; rather, it goes into solution in water. When the precursor is gelled, an ion-exchange takes place with the alkaline earth metal cation taking the place of the alkali metal cation and thus gelling the carbohydrate. However, when these fibers are boiled in sodium (or other alkali metal) solution, ion-exchange again takes place with sodium taking the place of the alkaline earth metal, thus rendering the carbohydrate partially soluble in water.

It is, therefore, an object of the present invention to provide a protein-carbohydrate fiber which can withstand treatment in boiling "salt" water.

It is a further object of this invention to provide a process for modifying alkaline earth metal carbohydrate fibers so that the deteriorating effects on the fibers of boiling in "salt" water are inhibited.

Accordingly, this invention provides a protein-carbohydrate fiber which will withstand the deteriorating effects of boiling in "salt" water. The invention comprises adding to the gelling bath, wherein the alkali metal carbohydrate fibers are gelled by treatment with an alkaline earth metal at a slightly acidic pH, a small amount, e.g., 0.1 to 5.0% by weight of a soluble aluminum salt such as aluminum chloride, aluminum acetate, aluminum chlorate, aluminum nitrate, and the like. Further, the addition of the aluminum salt enhances the resultant strength of the fiber.

Preferably, the process of the present invention comprises: (a) forming a dispersion of a proteinaceous material (e.g., an inert or a modifiable proteinaceous material) and a solution of a polymeric carbohydrate gel precursor capable of producing a continuous thermostable gel; (b) forming the resulting dispersion into fibers, e.g., by extrusion through a spinnerette; and (c) treating the fibers so formed in a slightly acidic, aqueous bath containing an alkaline earth metal cation and aluminum to gel the precursor and transform the proteinaceous material, if of a modifiable nature, from its solution state into a substantially solid state. The final fibers are usually arranged into tows and bound together by use of an edible binder to form a meat-like product.

The gelled fiber is comprised of aluminum and an alkaline earth metal carbohydrate fiber. It has been found that the presence of aluminum in a carbohydrate fiber protected the system from deteriorating ion exchange which can occur if the fiber is heated in an alkali metal salt solution. That is, when, for example, calcium alginate fiber is heated in the presence of sodium or potassium salts, the calcium alginate reverts to the sodium or potassium alginate with the resultant loss in fiber strength. The presence of aluminum in the fiber prevents the reversion.

The aluminum salt which is to be added to the gelling bath in the present invention can be any of the ionizable aluminum salts, such as aluminum cholride, aluminum sulfate, aluminum nitrate, aluminum chlorate, and the like, including mixtures. The aluminum salt should be added in an amount of from about 0.10 to 5.0% by weight of the bath depending upon the type of fiber desired, i.e., large amounts of aluminum will give a hard and tough fiber while small amounts will give a fiber which is much more susceptible to ion exchange.

The carbohydrate material used in this invention is selected from one of the many thermostable gel precursors such as those derived from algins or pectins and like polymeric carbohydrates, e.g., alkali salts of alginic acid and low methoxyl pectin, which generally have a high order of sensitivity to reaction with polyvalent cations. The gel-forming agents in the gelling bath are alkaline earth metal ions such as calcium and the like. These alkaline earth metal cations serve to gel the precursor and also to coagulate or to precipitate the protein, if the protein which is used is of a modifiable (i.e., precipitable or coagulable) nature. Ordinarily, the alkaline earth metal ion which is used is calcium acetate, and it is present in an aqueous solution.

Among the proteinaceous materials which can be employed are modifiable extracts of soybean meal, isolated proteins, peanut meal, fish protein meal, albumins, such as egg albumin and soy albumin, gelatin, caseins such as calcium paracaseinate and sodium caseinate, globulins, glutelins, and the like. Other color, flavor, and texture modifying ingredients can also be added. Among these are: oils, lard, chicken fat, tallow, beef extracts, chicken extracts, monosodium glutamate, dry skim milk powder, and the like.

The temperature of the spinning dispersion can vary considerably although it is usually held at about room temperature, 20–25° C. The extrusion step of the process is usually conducted at slightly elevated temperatures and pressures, e.g., about 20–60° C. and 0 to 100 p.s.i. The pH of the spinning dispersion should be at least slightly acidic, e.g., 5.0 to 7.0, preferably 6.0 to 7.0.

As stated above, the gel precursor is gelled by treatment of the fibers immediately after formation with an aqueous solution of a polyvalent cation, e.g., an alkaline earth metal ion such as calcium. A preferred bath is comprised of calcium acetate at slightly acidic conditions, e.g., at a pH of 4.5 to 6.0, preferably 5.0 to 5.5. The pH can be adjusted by the addition of a weak acid, preferably a weak organic acid, such as acetic acid.

The protein, if of a modifiable form, is either precipitated by lowering the pH of the bath to the isoelectric pH of the protein, or it is coagulated by heating the fibers after the alkaline earth metal cation solution treatment to gel the precursors. Alternatively, the protein can be in a non-modifiable form, and the fibers therefrom would thus require no treatment other than gellation of the polymeric carbohydrate gel precursor.

Thus, it can be seen that this invention provides a novel fibrous meat-like product which is not susceptible to alkaline earth metal-alkali metal ion exchange when the product is heated in an alkali-metal solution, and thus, the product will not break down in cooking if the consumer desires to add table salt thereto.

The following examples further illustrate the objects and advantages of this invention, but the particular protein material, polymeric carbohydrate material, aluminum salt, alkaline earth metal salt, and treating conditions should not be construed to unduly limit the invention.

Example I

An aqueous colloidal solution having the following composition:

| Ingredients: | Parts by weight |
| --- | --- |
| Isolated soy protein | 1800 |
| Water | 19500 |
| Antifoam agent | 100 |
| Sodium alginate | 178 |
| Fat (chicken) | 90 | was extruded through a 204-hole spinnerette having holes 0.015″ in diameter into a coagulating bath containing 1.0% by weight aluminum chloride, 1.0% by weight calcium oxide, 2.5% by weight glacial acetic acid, and 95.5% water.

The treated fibers which formed in the coagulating bath were washed with water, after which a small amount of the fibers were boiled for 30 minutes in an aqueous 1.0% solution of sodium chloride. The boiled material was quite tough and was considerably tougher than a control sample which was made by the same method as above except that the coagulating bath contained 3.5% by weight calcium acetate and no aluminum chloride.

The rest of the washed fibers were arranged into tows and bound together by use of a small amount of an edible protein binder. These tows were autoclaved and canned in a 0.5% sodium chloride solution. On standing, there was no noticeable discoloration nor was there a loss of toughness. The control sample suffered discoloration and loss of strength when canned in a similar fashion.

Various modifications and alterations of this invention will become obvious to those skilled in the art from the foregoing description without departing from the scope and spirit of the invention, and it should be understood that this invention is not to be limited unduly to that set forth herein for illustrative purposes.

I claim:

1. In a method for preparing an edible food product having a fibrous texture wherein a dispersion of protein and a polymeric carbohydrate gel precursor is extruded into a fiber and the gel precursor is gelled by treatment in an alkaline earth metal solution, the improvement which comprises adding to the alkaline earth metal solution a water-soluble aluminum salt in an amount sufficient to render the gelled fiber resistant to ion exchange when contacted with an alkali metal salt solution.

2. The method of claim 1 wherein the aluminum salt is added in an amount of from 0.1 to 5% by weight.

3. The method of claim 1 wherein the aluminum salt is aluminum chloride.

4. An edible food product comprising an aggregation of treated polymeric carbohydrate fibers, each of said fibers being composed of aluminum-alkaline earth metal-polymeric carbohydrate material which is resistant to alkali metal ion exchange, said product being prepared by the method of claim 1.

References Cited

UNITED STATES PATENTS 349,760   9/1886   Stanford _____ 99—131 XR
3,093,483 6/1963   Ishler et al. _____ 99—131

RAYMOND N. JONES, Primary Examiner
J. R. HOFFMAN, Assistant Examiner

U.S. Cl. X.R.

99—17